(12) United States Patent
Uenuma et al.

(10) Patent No.: US 6,580,986 B1
(45) Date of Patent: Jun. 17, 2003

(54) LANE-FOLLOWING SYSTEM BY DETECTION OF LANE MARKING

(75) Inventors: Kenya Uenuma, Kanagawa (JP); Shigeki Satoh, Kanagawa (JP); Hiroyuki Furusho, Kanagawa (JP); Masayasu Shimakage, Kanagawa (JP); Hiroshi Mouri, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/627,310

(22) Filed: Jul. 27, 2000

(30) Foreign Application Priority Data

Aug. 2, 1999 (JP) ............................................ 11-219172

(51) Int. Cl.[7] .......................... G01C 22/00; G06F 7/00
(52) U.S. Cl. .............................. 701/41; 701/28; 701/43; 340/937; 348/119; 180/168
(58) Field of Search .............................. 701/41, 36, 23, 701/24, 28, 43, 301; 340/937, 435, 436, 905, 938, 465; 180/168, 169, 167, 204; 348/118, 119, 169; 382/286, 287, 291

(56) References Cited

U.S. PATENT DOCUMENTS

| 5,765,116 | A |   | 6/1998  | Wilson-Jones et al. ....... 701/41 |
| 5,913,375 | A |   | 6/1999  | Nishikawa .................... 180/168 |
| 5,979,581 | A |   | 11/1999 | Ravani et al. ............... 180/168 |
| 6,005,492 | A | * | 12/1999 | Tamura et al. ............... 340/937 |
| 6,009,377 | A | * | 12/1999 | Hiwatashi .................... 701/301 |
| 6,070,112 | A | * | 5/2000  | Sato et al. .................... 701/41 |
| 6,138,062 | A | * | 10/2000 | Usami ........................... 701/23 |
| 6,226,592 | B1| * | 5/2001  | Luckscheiter et al. ...... 701/301 |
| 6,263,270 | B1| * | 7/2001  | Sato et al. .................... 701/41 |
| 6,269,897 | B1| * | 8/2001  | Tamura et al. .............. 180/168 |

FOREIGN PATENT DOCUMENTS

| EP | 0 555 987    | 8/1993 |            |
| JP | 09167013 A   | 6/1997 | G05D/1/02  |
| JP | 10203395 A   | 8/1998 | B62D/6/00  |

* cited by examiner

Primary Examiner—Jacques H. Louis-Jacques
(74) Attorney, Agent, or Firm—Foley & Lardner

(57) ABSTRACT

A CCD camera or equivalent sensor is mounted on a vehicle and used to detect lane markings (usually the white or yellow painted lines) on a roadway. An electric motor coupled to a steering system is used to provide a torque input to the steering, which may either assist or oppose the steering torque from a driver. A steering controller is designed to assist the driver to maintain the vehicle lane position by holding the vehicle at a target point using a biasing torque. The controller resumes application of the biasing torque upon expiration of a predetermined period of delay time since a change from the absence of detection of lane marking to the presence of detection of lane marking after the presence of detection of lane marking that continues for a period of time less than a predetermined period of time has occurred a predetermined number of times within a predetermined period of monitoring time or the absence of detection of lane marking continues for a predetermined period of time.

12 Claims, 5 Drawing Sheets

LANE-FOLLOWING SYSTEM BY DETECTION OF LANE MARKING

FIELD OF THE INVENTION

The present invention relates generally to a driver assistance system for facilitating steering of a vehicle by tracking a target line of a roadway, and more particularly to a lane-following system based on detection of lane markings (usually painted white or yellow lines) on the surface of a roadway.

BACKGROUND OF THE INVENTION

A number of technologies for lateral control by detection of lane markings have emerged. Some of such technologies are disclosed in U.S. Pat. Nos. 5,913,375, 5,765,116 and 5,979,581. In U.S. Pat. No. 5,913,375, a CCD camera mounted on a vehicle detects the presence of lane markings on a roadway and carries out a lateral control of a vehicle in relation to the detected lane marking. In U.S. Pat. No. 5,765,116, a video camera or a CCD camera is used to detect the presence of lane marking. An associated signal processor estimates the vehicle lateral position in relation to the detected lane markings. An electric motor coupled to the steering mechanism is used to provide a torque input to the steering. A controller is designed to assist the driver to maintain the vehicle lane position using a torque input to the steering. In U.S. Pat. No. 5,979,581, a laser sensor is used to detect three points on a painted lane marking on the surface of a roadway and three points are used to estimate the position of the lane centerline relative to the vehicle, as well as the geometry of the roadway. These technologies rely on detection of lane marking so that lateral control is cancelled or disabled in the absence of detection of lane markings and resumed in the presence of detection of lane markings. If the system is switched on and off frequently, the driver may feel unpleasant and unnecessary stress might be applied to the system. Therefore, there is a need for a new approach to the lateral control of vehicles by detection of lane markings at a preview distance in front of a moving vehicle, which does not induce unnecessary switching on and off the system. The present invention satisfies the need.

SUMMARY OF THE INVENTION

An object of the present invention is to provide a lane-following system of facilitating steering of a vehicle by tracking a lane of a roadway, which system is free from undesired switching on and off due to absence of and presence of detection of lane marking.

Another object of the present invention is to provide a method of facilitating steering of a vehicle by tracking a target line of a roadway, which method is free from undesired switching on and off due to absence of and presence of detection of lane marking.

According to one aspect of the present invention, there is provided a lane-following system of facilitating steering of a vehicle by tracking a lane of a roadway, the vehicle having a steering system, said lane-following system comprising:

a look-ahead sensor detecting the presence of lane marking on the surface of a roadway in relation to the vehicle;

a processor estimating the position of the vehicle in relation to said detected lane marking; and a steering controller rendered operable in the presence of detected lane marking but inoperable in the absence of detected lane marking, said steering controller, when rendered operable, producing, based on said estimated position of the vehicle, a steering control signal of magnitude to produce, in turn, a bias to the steering system, said steering controller being operable to determine whether or not said look-ahead sensor has detected the presence of lane marking, and to evaluate the manner in which said look-ahead sensor has failed to detect the presence of lane marking to provide an evaluation result, said steering controller being held inoperable in response to said evaluation result for a predetermined period of delay time since said look-ahead sensor has resumed to detect the presence of lane marking until said steering controller is subsequently rendered operable upon expiration of said predetermined period of delay time.

According to another aspect of the present invention, there is provided a method of facilitating steering of a vehicle by tracking a target line of a roadway, the vehicle being provided with a steering system, the target line being a line between lane markings defining the lane, comprising:

applying a steering bias to the steering system in such a manner as to assist driver in tracking the target line in the presence of detection of the presence of lane marking;

disabling application of the steering bias to the steering system in the absence of detection of the presence of lane marking; and resuming application of the steering bias to the steering system upon expiration of a predetermined period of delay time since a change from the absence of detection of lane marking to the presence of detection of lane marking after a predetermined phenomenon had occurred.

BRIEF DESCRIPTION OF THE DRAWINGS

The invention will be fully understood by reference to the following drawings, which are for illustrative purposes only.

DESCRIPTION OF THE PREFERRED EMBODIMENTS

Figure 1:
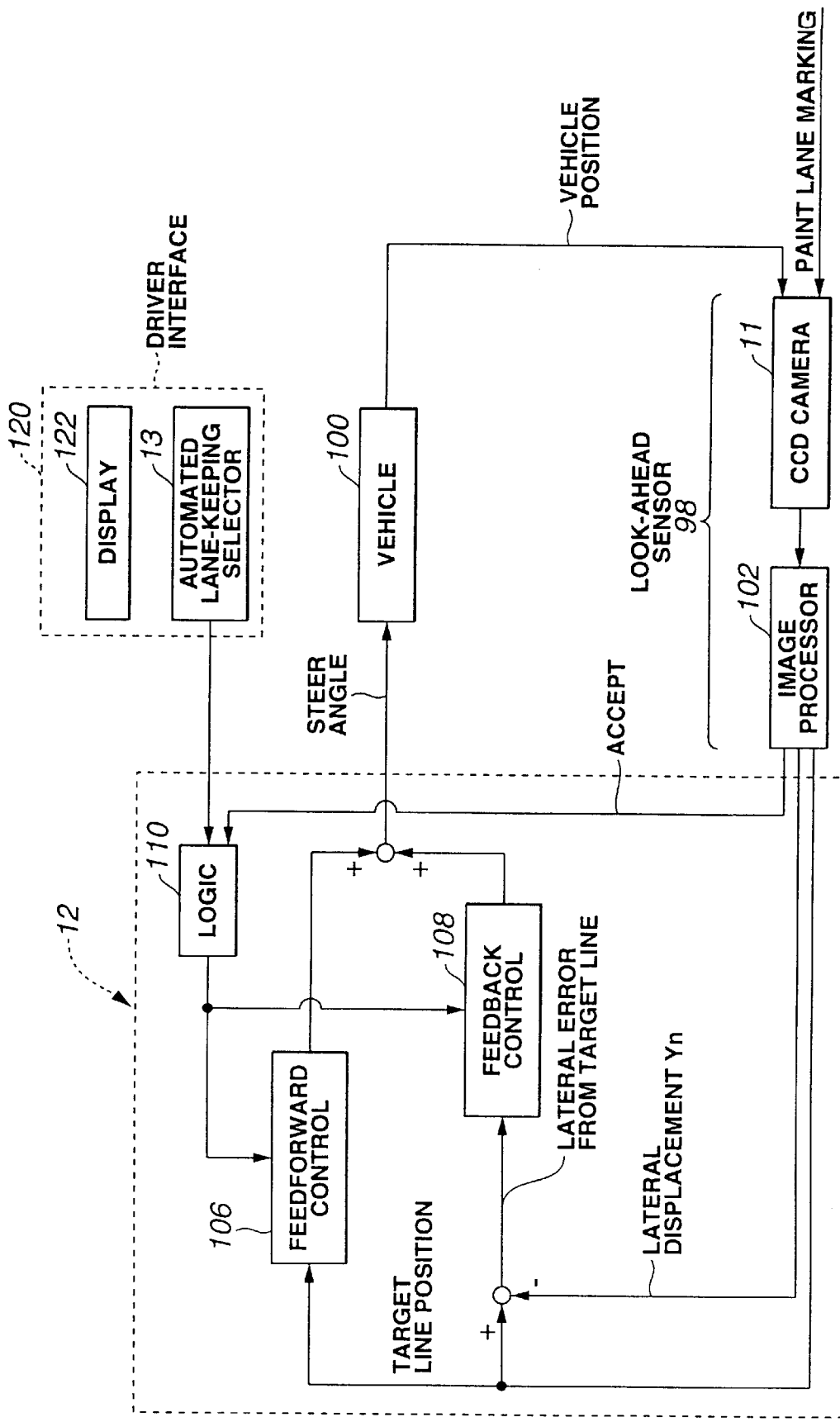
FIG. 1 is a functional block diagram of an automated lane-following system in accordance with the present invention.

For illustrative purposes, the present invention will be described with reference to FIG. 1 through FIG. 5, where like reference numerals denote like parts, and that the method may vary as to the steps and their sequences, without departing from the basic concept as described herein.

Referring first to FIG. 1, a functional block diagram of an automated lane-following system employing the present invention is shown. The system comprises a look-ahead sensor 98 mounted on a vehicle 100, and a steering controller 12. The steering controller 12 comprises a feedforward control module 106, a feedback control module 108, and a logic module 110. It will be appreciated from the discussion herein that steering controller 12 and each of the modules included therein would typically be implemented in software on a computer, but hardware and/or firmware implementations are also contemplated.

Look-ahead sensor 98 is a conventional system including a CCD camera 11 and an associated image processor 102. The CCD camera 11 is mounted on the vehicle, for example, in the middle of the bonnet or grille, or in the vicinity of the internal rear view mirror in order to detect the presence of lane markings on a roadway, for example the spaced white or yellow lines defining a lane. Image processor 102 acquires images from CCD camera 11 and estimates the position of a target line in relation to the lane markings and the lateral displacement Yn of vehicle 100 from one of the lane markings. The target line may be a lane centerline. The estimated target line and lateral displacement signals are fed to steering controller 12 together with an "ACCEPT" signal. Image processor 102 monitors the image signals from CCD camera 11 and switches the "ACCEPT" signal between "1" level and "0" level. If look-ahead sensor 98 locates the lane markings, the "ACCEPT" signal is at the "1" level. The "ACCEPT" signal is otherwise at the "0" level. This "ACCEPT" signal is used in determining whether or not the CCD camera 11 detects or recognizes lane markings.

Feedforward control module 106 produces a feedforward steering term based on the target line position from image processor 102. Feedback control module 108 produces a feedback steering term based on a lateral error from the target line, i.e., a difference between the target line and lateral displacement Yn. The feedforward and feedback terms combine to produce a steering control signal for the desired front steering angle, which is sent to a steering actuator (not shown in FIG. 1) on vehicle 100.

Controller 12 responds to the signals from look-ahead sensor 98 and produces a steering control signal of greater or lesser magnitude to provide, in turn, a greater or smaller bias to the steering system depending upon the lateral error from the target line. The actuator coupled to the steering mechanism is used to provide a torque input to the steering which may either assist or oppose the steering torque from the vehicle driver.

The steering bias applied by the lane-following system can be switched on and off by the use of an automated lane-following selector switch 13 on a driver interface 120 that may have a display 122.

The lane-following system is first switched on by operation of selector switch 13 and display 122 indicates that this has occurred. The system then searches the lane markings. While the system is doing this, the message on display 122 reads "searching". As soon as the system locates the lane markings, display 122 indicates "accept". If the lane marking is lost, display 122 returns "searching" until it again locates the lane marking with display 122 returning to "accept".

Logic module 110 in response to the "ACCEPT" signal monitors recognition of lane markings by look-ahead sensor 98. If the "ACCEPT" signal is at "1" level, it is determined that recognition of lane marking is possible. If it is at "0" level, recognition of lane markings is not possible.

Let us now assume that appearance of "1" level "ACCEPT" signal activates the system. In this case, the system is activated upon appearance of "1" level "ACCEPT" signal and deactivated upon disappearance thereof. This control strategy is satisfactory to certain extent. However, a need remains to prevent activation of the system upon appearance of "1" level "ACCEPT" signal if it is estimated that "1" level "ACCEPT" signal might be interrupted immediately or frequently within a short period of time. The logic module 110 monitors the "ACCEPT" signal to provide this estimation.

Figure 4:
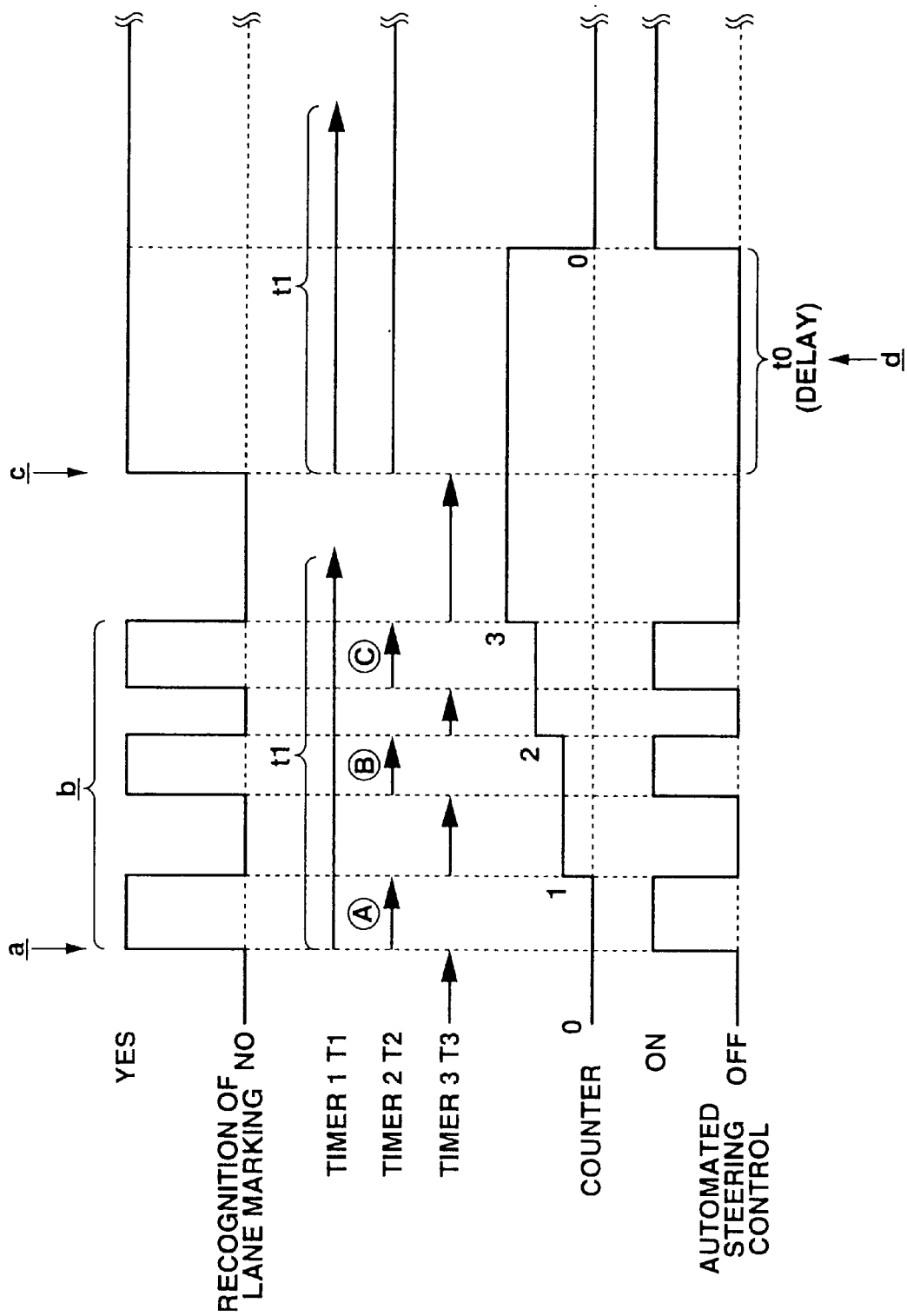
FIG. 4 is a timing diagram illustrating the operation of the present invention.
Figure 5:
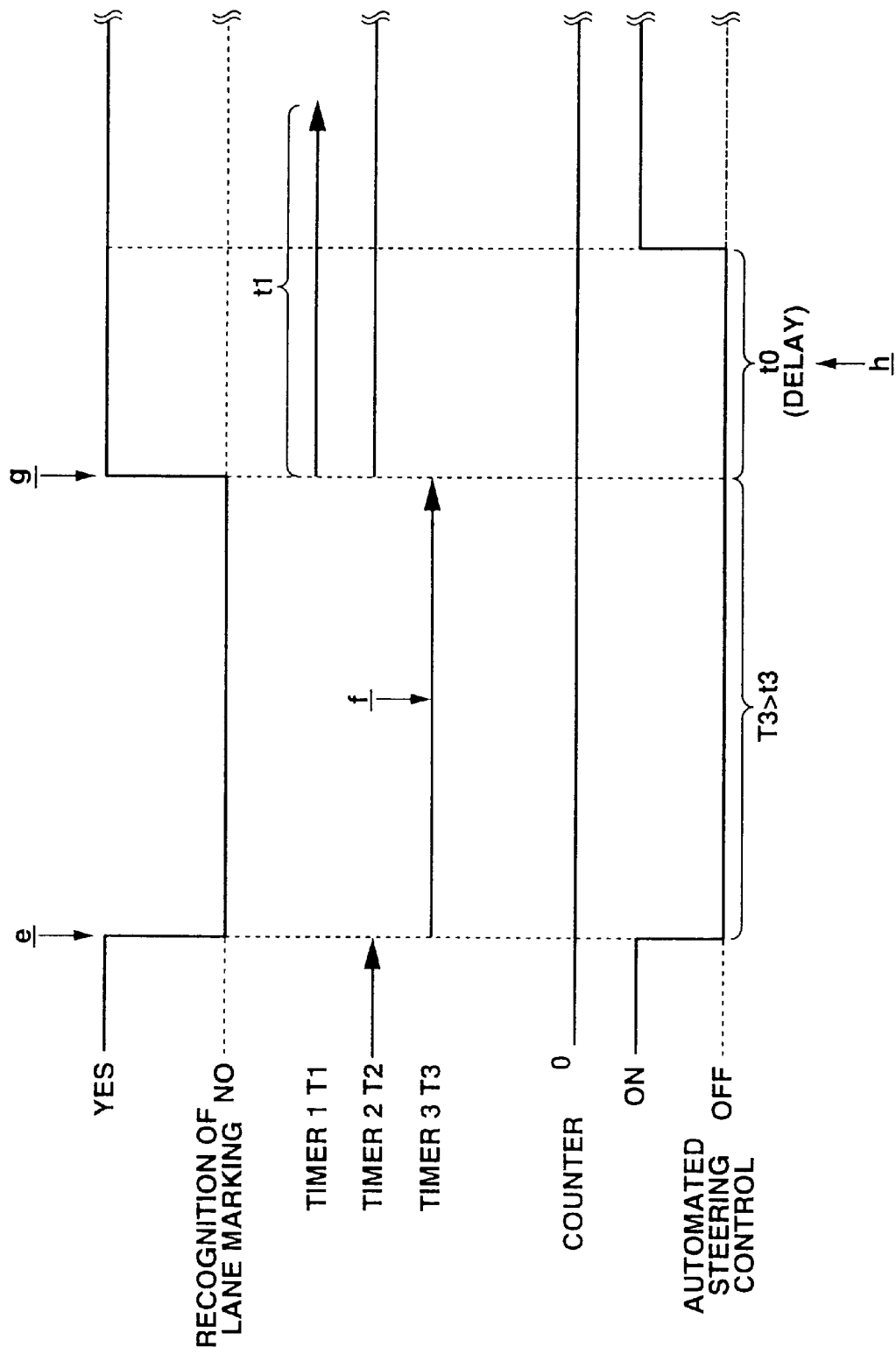
FIG. 5 is a timing diagram illustrating the operation of the present invention.

Referring to FIGS. 4 and 5, the logic module 110 has a clock, a first timer T1, a second timer T2, a third timer T3, and a counter N. Timer T1 automatically stops counting clock pulses from the clock upon expiration of a predetermined monitoring period of time t1, and it starts counting from zero if the level of "ACCEPT" signal has changed to "1" level from "0" level under a condition that $T1 \geq t1$. Timer T2 is used to measure a period of time when the "ACCEPT" signal stays at "1" level. It starts counting up clock pulses if the level of "ACCEPT" signal has changed to "1" level from "0" level and stops counting if the level of "ACCEPT" signal has changed back to "0" level. Timer T3 is used to measure a period of time when the "ACCEPT" signal stays at "0" level. It starts counting up clock pulses if the level of "ACCEPT" signal has changed to "0" level from "1" level and stops counting if the level of "ACCEPT" signal has changed back to "1" level.

The timing diagram of FIG. 4 illustrates the case where if, within the period of time to beginning with a change in level of "ACCEPT" signal from "0" to "1, the temporary "1" level "ACCEPT" signal has occurred a predetermined number n of times (n=3 in this example), then the subsequent occurrence of "1" level "ACCEPT" signal will not immediately activate the system until the "1" level "ACCEPT" signal continues for a predetermined delay time t0. In FIG. 4, the encircled reference characters A, B and C represent three occurrences of such temporary "1" level "ACCEPT" signal. The term "temporary "1" level "ACCEPT" signal" is herein used to mean occurrence of "1" level "ACCEPT" signal over a period of time T2 shorter than or equal to a predetermined time t2.

The timing diagram of FIG. 5 illustrates the case where if "0" level "ACCEPT signal occurs for an extended period of time t3, then the subsequent occurrence of "1" level "ACCEPT" signal will not immediately activate the system until the "1" level "ACCEPT" signal continues for a predetermined delay time t0. In FIG. 5, the reference character f represents occurrence of such extended "0" level "ACCEPT" signal. The term "extended "0" level "ACCEPT" signal" is herein used to mean occurrence of "0" level "ACCEPT" signal over a period of time T3 longer than a predetermined time t3.

The logic as illustrated in FIGS. 4 and 5 is effective to prevent undesired repetition of interruption of the system activation during travel of the vehicle on a roadway on which lane markings are difficult to locate.

The preceding description clearly indicates that if the logic anticipates occurrence of such repetition of interruption of system activation, namely, "control hunting", it will prohibit initiation of the system activation even if the system locates lane marking until the system keeps on locating lane marking for the predetermined period of delay time t0.

Specifically, it will be appreciated that the logic anticipates occurrence of control hunting if, within predetermined period of monitoring time t1, the temporary "1" level "ACCEPT" signal appears n times, the system recognizes the state as the control hunting mode. For example, if lane marking on a roadway is still partially covered with snow so that the lane marking is located intermittently, the system anticipates the occurrence of control hunting.

It will also be appreciated that the logic anticipates occurrence of control hunting if the "0" level "ACCEPT"

signal keeps on appearing for the predetermined period of time t3, the system recognizes the condition as a cause of control hunting. For example, if lane marking on a roadway is completely covered with snow so that the lane marking is lost more than the predetermined period of time t3, the system anticipates the occurrence of control hunting.

Figure 2:
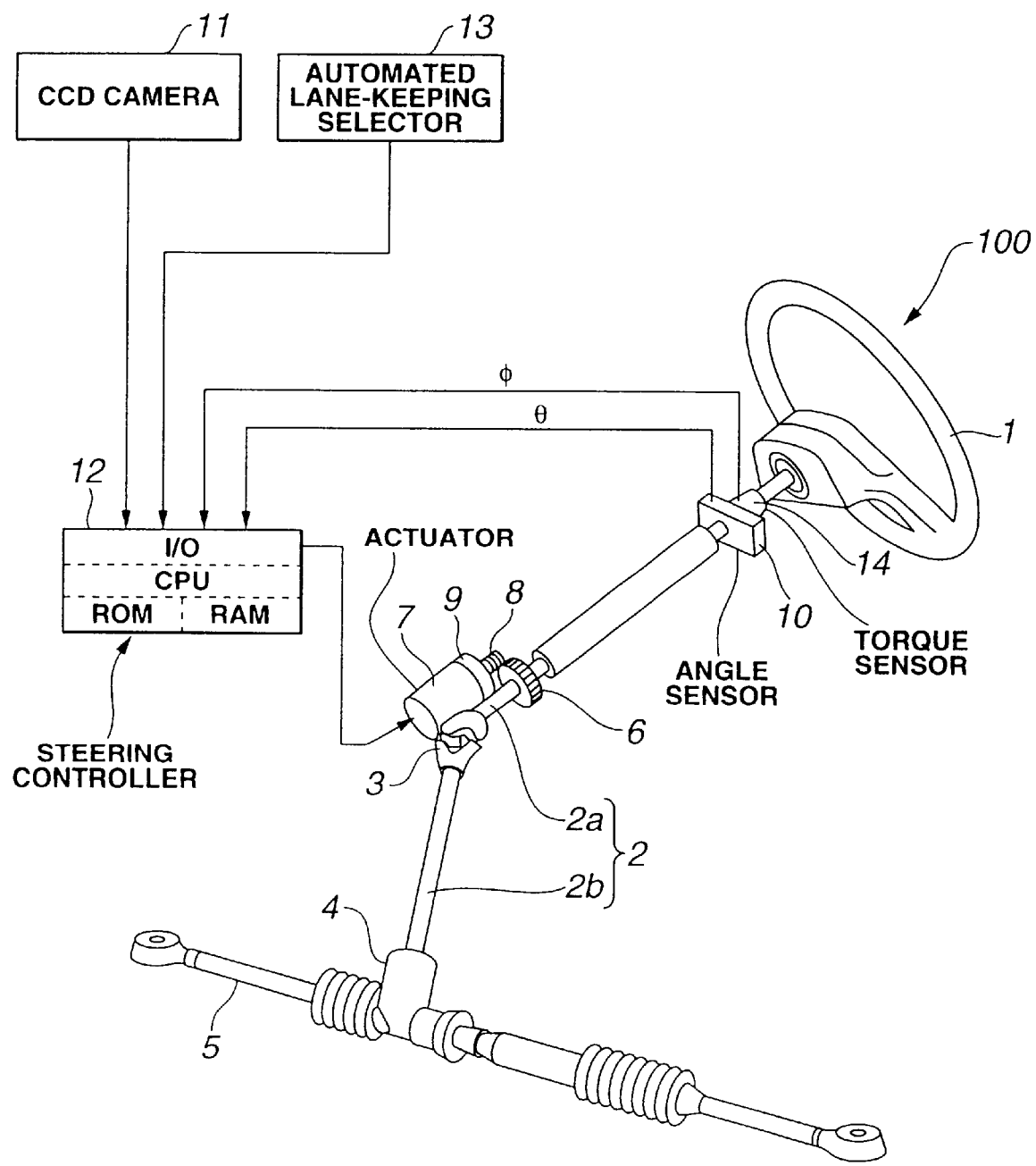
FIG. 2 is a diagrammatic view of a hardware configuration of an automated lane-following system in accordance with the present invention.

FIG. 2 illustrates an automated lane-following system according to the present invention. The reference numeral 100 designates a vehicle having a steering system. A steering wheel 1 is connected for unitary rotation with an upper shaft 2a of a steering shaft 2. A lower shaft 2b is coupled with upper shaft 2a via a universal joint 3. Within a rack and pinion type steering gear box 4, lower shaft 2b has, at its lower end, a pinion, not shown, which is in meshing engagement with a pair of side rods 5 that are operatively connected with front right and left road wheels, respectively.

A wheel gear 6 is fixedly coupled with upper shaft 2a at a portion near its lower end. An actuator in the form of a motor 7 is mounted adjacent upper shaft 2a and has a worm 8 in meshing engagement with wheel gear 6. An electromagnetic clutch 9 is disposed between motor 7 and worm 8. A drive of motor 7 is transmitted to worm 8 to apply steer bias to the steering system.

A steer angle sensor 10, which is attached to an upper portion of upper shaft 2a, detects angular position of upper shaft 2a relative to its neutral position. It generates a steer angle signal θ indicative of the detected angularposition. Steer angle signal θ is fed to a steering controller 12, which is a conventional microcomputer based control unit including, as usual, a central processor unit (CPU), a random access memory (RAM), a read only memory (ROM), an input output device (I/O) and an internal clock. The CPU, RAM, ROM and I/O are interconnected by data bus. Controller 12 shown in FIG. 2 is substantially the same as its counterpart in FIG. 1, but it performs the function of the image processor 102 of FIG. 1.

Controller 12 has an actual steer angle calculation module implemented in software and stored in the ROM. Using this software, the CPU derives actual steer angle θd from angular displacement θ and steering gear ratio. Image signals from a CCD camera 11 are fed to controller 12. CCD camera 11 is mounted on a vehicle 100 in the vicinity of the internal rear view mirror in order to detect the presence of lane markings on a roadway. Controller 12 has an image processor module implemented in software and stored in the ROM. Using this software, controller 12 estimates the position of a target line in relation to the lane markings and the lateral displacement Yn of vehicle 100 from one of the lane markings. It monitors the image signals from CCD camera 11 and sets an "ACCEPT" signal at "1" level if CCD camera 11 locates the lane markings. Controller 12 sets the "ACCEPT" signal at "0" level if CCD camera 11 loses or is searching the lane markings. The target line position signal and lateral displacement signal are used in determining a target value in operation parameter of the steering system.

A torque sensor 14, such as disclosed in EP 0 555 987 B1, comprises a compliant element in the upper portion of upper shaft 2a in the vicinity of steer angle sensor 10 in order to detect torsional angle φ of upper shaft 2a either optically or inductively. The detected torsional angle φ represents driver input torque through steering wheel 1. A signal indicative of the detected torsional angle φ is fed to controller 12. Controller 12 has an actual steer torque calculation module implemented in software and stored in the ROM. Using this software, controller 12 derives actual steer torque Td from torsional angle φ.

The lane-following system can be switched on and off by a driver through an automated lane-following selector switch 13. When the lane-following system is switched on, controller 12 keeps on determining a target value in operation parameter such as steer torque or steer angle. If steer torque is used as the operation parameter, steer angle sensor 10 and the actual steer angle calculation module may be omitted. In this case, controller 12 determines a target steer torque Tr based on the estimated position of target line and the lateral displacement. It produces a steering control signal of magnitude to provide, in turn a torque input to the steering which may assist or oppose the steering torque from the driver, whereby the actual steer torque Td approaches the target steer torque Tr. In response to the steering control signal, electric current passing through motor 7 is regulated to provide such torque input to the steering. If steer angle is used as the operation parameter, torque sensor 14 and the actual steer torque calculation module may be omitted. In this case, controller 12 determines a target steer angle Topt in response to the position of target line and the lateral displacement. It determines a steering control signal. In response to the steering control signal, the electric motor 7 provides a torque input to the steering which may either assist or oppose the steering torque from the driver, such that a deviation of actual steer angle Od from target steer angle Topt approaches zero.

Figure 3:
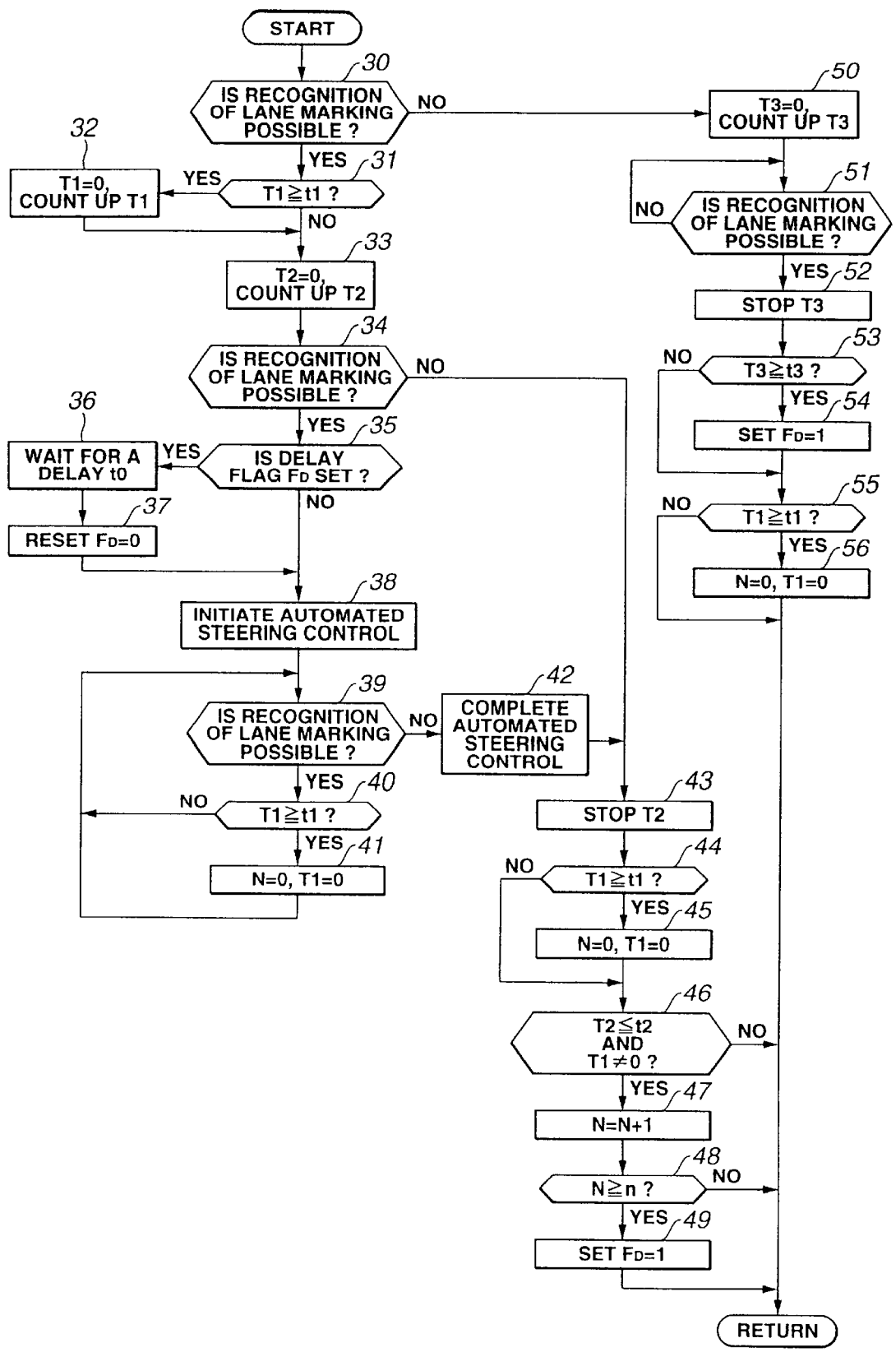
FIG. 3 is a flow chart of a control routine implementing the present invention.

Controller 12 shown in FIG. 2 has a logic module substantially the same as logic module 110 shown in FIG. 1. Referring to FIG. 3, the logic module is implemented in software stored in the ROM. The flow chart of FIG. 3 is a control routine implementing the present invention.

At step 30, the CPU determines whether or not recognition of lane marking is possible by checking the level of the "ACCEPT" signal from the image processor module. If the "ACCEPT" signal is at "1" level, the CPU determines that recognition of lane marking is possible so that the interrogation at step 30 results in affirmative (YES). If the "ACCEPT" signal is at "0" level, the CPU determines that recognition of lane marking is not possible so that the interrogation at step 30 results in negative (NO). The routine proceeds from step 30 to step 31 if the recognition of lane marking is possible. The routine proceeds from step 30 to step 50 if the recognition of lane marking is not possible.

At step 31, the CPU determines whether or not first timer T1 is greater than or equal to predetermined period of monitoring time t1. If the interrogation at step 31 results in affirmative (YES), the routine proceeds to step 32. If it results in negative, the routine proceeds to step 33.

At step 32, the CPU resets first timer T1 equal to zero (T1=0) and allows timer T1 to count up clock pulses from zero, the clock pulses being generated by the internal clock of controller 12. Then, the routine proceeds to step 33. At step 33, the CPU resets second timer T2 equal to zero (T2=0) and allows timer T2 to count up clock pulses from zero. Subsequently, the routine proceeds to step 34.

At step 34, the CPU determines whether or not recognition of lane marking is possible by checking the level of the "ACCEPT" signal from the image processor module. If this is the case (YES), the routine proceeds to step 35. If the interrogation at step 34 results in negative (NO), the routine proceeds to step 43.

At step 35, the CPU determines whether or not a delay flag $F_D$ is set. If this is the case (YES), the routine proceeds to step 36. If, at step 35, delay flag $F_D$ is reset, the routine proceeds to step 38.

At step 36, the CPU waits for a predetermined period of delay time t0. Next, the routine proceeds to step 37. At step 37, the CPU resets delay flag $F_D$ ($F_D=0$). Then, the routine proceeds to step 38.

At step 38, the CPU initiates automated steering control. Next, the routine proceeds to step 39.

At step 39, the CPU determines whether or not recognition of lane marking is possible by checking the level of the "ACCEPT" signal from the image processor module. If this is the case (YES), the routine proceeds to step 40. If the interrogation results in negative, the routine proceeds from step 39 to step 42.

At step 40, the CPU determines whether or not first timer Ti is greater than or equal to the predetermined period of monitoring time t1. If this is the case (YES), the routine proceeds to step 41. If the interrogation at step 40 results in negative (NO), the routine returns to step 39.

At step 41, the CPU resets a counter N equal to zero (N=0) and first timer T1 equal to zero (T1=0). Then, the routine returns to step 39.

At step 42, the CPU terminates or completes automated steering control that had been initiated at step 38. It is to be noted that the automated steering control is disabled whenever lane marking is lost. Next, the routine proceeds to step 43.

At step 43, the CPU stops second timer T2. Second timer T2 ceases its counting operation. Then, the routine proceeds to step 44.

At step 44, the CPU determines whether or not first timer T1 is greater than or equal to period of time t1. If this is the case (YES), the routine proceeds to step 45. If the interrogation at step 44 results in negative (NO), the routine proceeds to step 46.

At step 45, the CPU resets counter N equal to zero (N=0) and resets first timer T1 equal to zero (T1=0). Then, the routine proceeds to step 46.

At step 46, the CPU determines whether or not second timer T2 is less than or equal to a predetermined period of time t2 and at the same time first timer T1 is not reset (T1≠0). If, at step 46, T2≦t2 and T1≠0, the routine proceeds to step 47. Otherwise, the routine returns from step 46 to START.

At step 47, the CPU increases counter N by one. Then, the routine proceeds to step 48.

At step 48, the CPU determines whether or not counter N is greater than or equal to a predetermined number n (for example, n=3). If this is the case (YES), the routine proceeds to step 49. If the interrogation results in negative (NO), the routine returns from step 48 to START.

At step 49, the CPU sets delay flag $F_D$ equal to 1 ($F_D=1$). Then, the routine returns to START.

If, at step 30, recognition of lane marking is not possible, the routine proceeds to step 50. At step 50, the CPU resets third timer T3 (T3=0) and allows third timer T3 to count up clock pulses. Then, the routine proceeds to step 51.

At step 51, the CPU determines whether or not recognition of lane marking is possible by checking the level of the "ACCEPT" signal from the image processor module. If this is the case (YES), the routine proceeds to step 52. If the interrogation at step 51 results in negative (NO), the CPU repeats the recognition at step 51 until it results in affirmative.

At step 53, the CPU determines whether or not third timer T3 is greater than or equal to a predetermined period of time t3. If this is the case (YES), the routine proceeds to step 54. If the interrogation at step 53 results in negative (NO), the routine proceeds to step 55.

At step 54, the CPU sets delay flag $F_D$ equal to 1 ($F_D=1$). Then, the routine proceeds to step 55.

At step 55, the CPU determines whether or not first timer T1 is greater than or equal to period of monitoring time t1. If this is the case (YES), the routine proceeds to step 56. If the interrogation at step 55 results in negative (NO), the routine returns to START.

At step 56, the CPU resets counter N and first timer T1 equal to zero, respectively (N=0, T1=0). Then, the routine returns to START.

[Automated Lane-following in Continuous Recognition of Lane Marking]

The automated lane-following system is switched on by driver's manipulation of selector switch 13. Assuming now that recognition of lane marking continues immediately after operation of selector switch 13 has switched on the lane-following system. In this case, the routine precedes along steps 30, 31, 33, 34, 35 and 38. Thus, at step 38, the automated steering control is initiated immediately after selector switch 13 has switched on the lane-following system.

Immediately after the initiation of the automated steering control at step 38, electric current passing through motor 7 is regulated in such a direction as to reduce a deviation of actual steer torque Td from target steer torque Tr or a deviation of actual steer angle θd from target steer angle Topt toward zero.

The automated steering control initiated at step 38 iscompleted at step 42 if it is determined at step 39 that recognition of lane marking is not possible. The automated steering control may be completed by operation of selector switch 13.

Accordingly, the automated steering control can be quickly initiated immediately after the vehicle driver has operated selector switch 13 to switch on the automated lane-following system if the vehicle travels on a highway having lane markings that are easy to recognize continuously.

[Automated Steering Control in Control Hunting Mode]

In the flow chart of FIG. 3, the CPU determines, at each of steps 30, 34 and 51, whether or not recognition of lane marking is possible. Repeating execution of a flow including steps 31, 32, 33 and steps 43, 44, 45, 46, 47 or repeating execution of a flow including steps 50, 51, 52, 53 reveal in what manner controller 12 recognizes lane markings through image signals from CCD camera 11. If controller 12 determines the manner of recognizing lane markings that might induce control hunting, delay flag $F_D$ is set at step 49 or 54. After delay flag $F_D$ has been set, the routine proceeds along step 30, 31, 33, 34 and then the routine proceeds along step 34, 35, 36, 37, 38 if recognition of lane marking continues. Accordingly, the automated steering control will be initiated upon expiration of the predetermined period of delay time t0 after beginning of continuous recognition of lane marking.

In the above-mentioned manner, controller 12 acquires lane surface conditions on a roadway by monitoring result of determination at step 30 or 34 or 51 whether or not recognition of lane marking is possible.

The lane-following system prevents the automated steering control from terminating immediately after it has begun because the initiation of automated steering control is delayed for the predetermined delay period of time t0.

Accordingly, the lane-following system is free from the control hunting of automated steering control, which might annoy driver.

[Repeated Interruption of Recognition of Lane Marking—First Type of Control Hunting Mode]

Let us now consider a roadway having lane markings partially covered with snow. If the automated steering control is switched on upon locating lane marking and switched off upon losing lane marking, the control hunting would occur during travel on the roadway mentioned above. Thus, there is a need for controller 12 to regard this roadway as a cause of control hunting.

Travel condition where interruption of recognition of lane marking is repeated causes controller 12 to determine occurrence of control hunting. The timing diagram of FIG. 4 illustrates how controller 12 determines occurrence of control hunting under this travel condition.

It is now assumed that controller 12 cannot recognize lane marking till moment a in FIG. 4. At moment a, controller 12 begins to recognize lane marking. During a period of time b that begins with moment a, the recognition of lane marking is interrupted twice. At the end of the period of time b, the recognition of lane marking ends. From the end of the period of time b to moment c beyond expiration of period of monitoring time t1, lane marking is lost continuously. It is also assumed that period of time during which recognition of lane marking continues is shorter than the predetermined period of time t2 at each of three consecutive events A, B and C. Accordingly, counter N is increased at the end of each of these events A, B and C. Immediately after expiration of period of monitoring time t1, since counter N has reached three, controller 12 sets the predetermined period of delay time t0 that is to be triggered by the subsequent beginning of recognition of lane marking at moment c. At moment upon expiration of the delay time t0, as indicated by an arrow d controller 12 initiates automated steering control.

[Continuous Lacking of Recognition of Lane Marking—Second Type of Control Hunting Mode]

Let us now consider a roadway having lane markings covered with snow. If the automated steering control is switched on upon locating lane marking and switched off upon losing lane marking, the control hunting would occur during travel on the roadway mentioned above. Thus, there is a need for controller 12 to regard this roadway as a cause of control hunting. Let us also consider the case where CCD camera 11 fails to operate properly and the "ACCEPT" signal stays at "0" level for most of operation time. In this case, controller 12 should regard this situation as a cause of control hunting.

Continuous lacking of recognition of lane marking over extended period of time causes controller 12 to determine occurrence of control hunting mode. The timing diagram of FIG. 5 illustrates how controller 12 determines occurrence of control hunting mode.

It is now assumed that controller 12 can recognize lane marking till moment e in FIG. 5. At moment a, controller 12 begins to lose lane marking. Over a period of time f that begins with moment , the recognition of lane marking is lost. At the end of the period of time f, the recognition of lane marking resumes. The period of time f is longer than the predetermined period of time t3. At moment when T3≧t3, controller 12 sets the predetermined period of delay time t0 that is to be triggered by the subsequent beginning of recognition of lane marking. At moment upon expiration of the delay time t0, as indicated by an arrow h, controller 12 initiates automated steering control.

In the preceding description along FIGS. 3 to 5, the predetermined periods of times t0, t1, t2 and t3 and the frequency n are invariable. These parameters may be subjected to alteration for example against variations of travel speed of a vehicle. In this case, the alteration may be automatically carried out against variations of travel speed during travel of the vehicle.

While the present invention has been particularly described with reference to the accompanying drawings, it is appreciated that according to a lane-following system of facilitating steering of a vehicle by tracking a lane of a roadway, a look-ahead sensor (98) detects the presence of lane marking on the surface of a roadway in relation to the vehicle. An image or signal processor (102) estimates the position of a moving vehicle in relation to the detected lane marking. A steering controller (12) is rendered operable in the presence of detected lane marking but inoperable in the absence of detected lane marking. The steering controller (12), when rendered operable, produces, based on the estimated position of the vehicle, a steering control signal of magnitude to produce, in turn, a bias to the steering system. The steering controller (12) is operable to determine whether or not the look-ahead sensor (98) has detected the presence of lane marking, and to evaluate the manner in which the look-ahead sensor (12) has failed to detect the presence of lane marking to provide an evaluation result. The steering controller (12) is held inoperable in response to the evaluation result for a predetermined period of delay time (t0) since the look-ahead sensor (12) has resumed to detect the presence of lane marking until the steering controller (12) is subsequently rendered operable upon expiration of the predetermined period of delay time (t0).

From the preceding description along with the accompanying drawings, it is also appreciated that a method of facilitating steering of a vehicle by tracking a target line of a roadway, comprises applying a steering bias to the steering system in such a manner as to assist driver in tracking the target line in the presence of detection of the presence of lane marking. The application of the steering bias to the steering system is disabled in the absence of detection of the presence of lane marking. The application of the steering bias to the steering system is resumed upon expiration of a predetermined period of delay time since a change from the absence of detection of lane marking to the presence of detection of lane marking after a predetermined phenomenon had occurred (see FIGS. 4 and 5).

While the present invention has been particularly described in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-219172, filed Aug. 2, 1999 is hereby incorporated by reference in its entirety.

What is claimed is:

1. A lane-following system of facilitating steering of a vehicle by tracking a lane of a roadway, the vehicle having a steering system, said lane-following system comprising:

a look-ahead sensor detecting the presence of lane marking on the surface of a roadway in relation to the vehicle;

a processor estimating the position of the vehicle in relation to said detected lane marking; and a steering controller rendered operable in the presence of detected lane marking but inoperable in the absence of detected lane marking, said steering controller, when rendered operable, producing, based on said estimated position of the vehicle, a steering control signal of magnitude to produce, in turn, a bias to the steering system, said steering controller being operable to determine whether or not said look-ahead sensor has detected the presence of lane marking, and to evaluate the manner in which said look-ahead sensor has failed to detect the presence of lane marking to provide an evaluation result, said steering controller being held inoperable in response to said evaluation result for a predetermined period of delay time since said look-ahead sensor has resumed to detect the presence of lane marking until said steering controller is subsequently rendered operable upon expiration of said predetermined period of delay time.

2. The lane-following system as claimed in claim 1, wherein said steering controller measures duration of time for which said look-ahead sensor detects the presence of lane marking and duration of time for which said look-ahead sensor fails to detect the presence of lane marking.

3. The lane-following system as claimed in claim 1, wherein said steering controller counts the number of times a predetermined phenomenon in which said look-ahead sensor has detected the presence of lane marking for a period of time less than a predetermined period of time occurs within a predetermined monitoring period of time, determines whether or not said counted number has a predetermined relation with a predetermined number, and sets a delay flag, said delay flag representing a need for holding said steering controller inoperable for said predetermined period of delay time.

4. The lane-following system as claimed in claim 3, wherein said steering controller resets said delay flag immediately after said steering controller has been held inoperable for said predetermined period of delay time.

5. The lane-following system as claimed in claim 3, wherein said steering controller determines whether or not a predetermined phenomenon in which said look-ahead sensor has failed to detect the presence of lane marking for a period of time greater than a predetermined period of time, and sets a delay flag, said delay flag representing a need for holding said steering controller inoperable for said predetermined period of delay time.

6. The lane-following system as claimed in claim 5, wherein said steering controller resets said delay flag immediately after said steering controller has been held inoperable for said predetermined period of delay time.

7. The lane-following system as claimed in claim 2, wherein said steering controller determines whether or not a predetermined phenomenon in which said look-ahead sensor has failed to detect the presence of lane marking for a period of time greater than a predetermined period of time, and sets a delay flag, said delay flag representing a need for holding said steering controller inoperable for said predetermined period of delay time.

8. The lane-following system as claimed in claim 7, wherein said steering controller resets said delay flag immediately after said steering controller has been held inoperable for said predetermined period of delay time.

9. A lane-following system of facilitating steering of a vehicle by tracking a lane of a roadway, the vehicle having a steering system, said lane-following system comprising:

means for detecting the presence of a lane marking on the surface of a roadway in relation to the vehicle;

means for estimating the position of the vehicle in relation to said detected lane marking; and a steering controller rendered operable in the presence of detected lane marking but inoperable in the absence of detected lane marking, said steering controller, when rendered operable, producing, based on said estimated position of the vehicle, a steering control signal of magnitude to produce, in turn, a bias to the steering system, said steering controller being operable to determine whether or not said look-ahead sensor has detected the presence of lane marking, and to evaluate the manner in which said look-ahead sensor has failed to detect the presence of lane marking to provide an evaluation result, said steering controller being held inoperable in response to said evaluation result for a predetermined period of delay time since said look-ahead sensor has resumed to detect the presence of lane marking until said steering controller is subsequently rendered operable upon expiration of said predetermined period of delay time.

10. A method of facilitating steering of a vehicle by tracking a target line of a roadway, the vehicle being provided with a steering system, the target line being a line between lane markings defining the lane, comprising:

applying a steering bias to the steering system in such a manner as to assist driver in tracking the target line in the presence of detection of the presence of lane marking;

disabling application of the steering bias to the steering system in the absence of detection of the presence of lane marking; and resuming application of the steering bias to the steering system upon expiration of a predetermined period of delay time since a change from the absence of detection of lane marking to the presence of detection of lane marking after a predetermined phenomenon had occurred.

11. A method of facilitating steering of a vehicle by tracking a target line of a roadway, the vehicle being provided with a steering system, the target line being a line between lane markings defining the lane, comprising:

applying a steering bias to the steering system in such a manner as to assist driver in tracking the target line in the presence of detection of the presence of lane marking;

disabling application of the steering bias to the steering system in the absence of detection of the presence of lane marking; and resuming application of the steering bias to the steering system upon expiration of a predetermined period of delay time since a change from the absence of detection of lane marking to the presence of detection of lane marking after a predetermined phenomenon had occurred;

wherein said predetermined phenomenon is a phenomenon in which the presence of detection of lane marking that continues for a period of time less than a predetermined period of time has occurred a predetermined number of times within a predetermined period of monitoring time.

12. The method as claimed in claim 10, wherein said predetermined phenomenon is a phenomenon in which the absence of detection of lane marking continues for a predetermined period of time.

* * * * *